United States Patent
Loeffler et al.

(10) Patent No.: US 8,762,032 B2
(45) Date of Patent: Jun. 24, 2014

(54) METHOD FOR COMPENSATING FOR GAS EXCHANGE LOSSES BETWEEN COMBUSTION CHAMBERS OF AN OTTO ENGINE

(75) Inventors: Axel Loeffler, Backnang (DE); Wolfgang Fischer, Gerlingen (DE); Roland Karrelmeyer, Bietigheim Bissingen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 948 days.

(21) Appl. No.: 12/859,074

(22) Filed: Aug. 18, 2010

(65) Prior Publication Data

US 2011/0041787 A1 Feb. 24, 2011

(30) Foreign Application Priority Data

Aug. 19, 2009 (DE) .......................... 10 2009 028 638

(51) Int. Cl.
*F02D 13/02* (2006.01)
*F02D 41/00* (2006.01)
*F01L 1/34* (2006.01)

(52) U.S. Cl.
USPC ........................................................ 701/109

(58) Field of Classification Search
USPC .................... 701/101, 102, 109, 111, 115; 123/568.21, 90.15, 345, 347
See application file for complete search history.

(56) References Cited

U.S. PATENT DOCUMENTS

| | | | |
|---|---|---|---|
| 7,404,391 B2 * | 7/2008 | Schueler et al. | 701/111 |
| 2007/0144481 A1 | 6/2007 | Ciecinski et al. | |
| 2009/0064974 A1 * | 3/2009 | Casal Kulzer | 123/559.1 |
| 2009/0301434 A1 * | 12/2009 | Hiller et al. | 123/90.15 |

FOREIGN PATENT DOCUMENTS

DE 10 2004 032 986 2/2006
JP 2011043162 A * 3/2011 .............. F02D 13/02

* cited by examiner

*Primary Examiner* — Hieu T Vo
(74) *Attorney, Agent, or Firm* — Kenyon & Kenyon LLP

(57) ABSTRACT

A method is presented for compensating for combustion chamber-specific actual values of a parameter, which characterizes combustions, between a plurality of combustion chambers of an Otto engine (10) operated with homogeneous filling of the combustion chambers and homogeneous charge compression ignition, said Otto engine (10) operating with a direct fuel injection and a variable valve drive, wherein the combustion chamber-specific actual values are formed as a function of signals ($S\_40$; $S\_42$) of combustion chamber-specific sensors (40; 42) and wherein deviations of the combustion chamber-specific actual values from a set value are processed to manipulated variables, with which a valve lift of a gas exchange valve (28) of a combustion chamber (12) is changed. The method distinguishes itself by the fact that a characteristic ($pmi\_ZV$), in which combustion chamber-specific charge change losses are reflected, is formed as a variable characterizing combustions and by the fact that a valve lift of an intake valve (28) of the combustion chamber (12) is changed as a manipulated variable. Independent claims relate in each case to a control unit, a computer program and a computer program product.

12 Claims, 4 Drawing Sheets

METHOD FOR COMPENSATING FOR GAS EXCHANGE LOSSES BETWEEN COMBUSTION CHAMBERS OF AN OTTO ENGINE

This application claims benefit of Serial No. 10 2009 028 638.1, filed 19 Aug. 2009 in Germany and which application is incorporated herein by reference. To the extent appropriate, a claim of priority is made to the above disclosed application.

BACKGROUND

The present invention relates to a method for compensating for combustion chamber-specific actual values of a parameter, which characterizes combustions, between a plurality of combustion chambers of an Otto engine operated with homogeneous filling of the combustion chambers and homogeneous charge compression ignition. Said Otto engine operates with a direct fuel injection and a variable valve drive, wherein the combustion chamber-specific actual values are formed as a function of signals of combustion chamber-specific sensors and wherein deviations of the combustion chamber-specific actual values from a set value are processed to manipulated variables, with which a valve lift of a gas exchange valve of a combustion chamber is changed. The invention furthermore relates to a control unit equipped to carry out said method, a correspondingly programmed computer program as well as a computer program product including a computer program of this type.

Such subject matters are in each case known from the German patent publication DE 10 2004 032 986 A1.

New combustion processes for Otto engines, which in the literature are designated as HCCI (Homogeneous Charge Compression Ignition) or CAI method (Controlled Auto Ignition), distinguish themselves from the conventional spark-ignition operation by a significant potential for fuel savings. These fuel savings occur particularly in partial load ranges (relevant to a test cycle).

Moreover, additional advantages result with this type of combustion like very low raw emissions of pollutants, particularly in comparison with the likewise fuel saving stratified charge mode. Additional, relatively expensive exhaust gas aftertreatment systems such as NOx storage catalytic converters can therefore be dispensed with. These advantages are the result of the combination of different effects such as low combustion temperatures and a very homogeneous mixture formation, which lead to a plurality of exothermic centers in the combustion chamber and thereby to a very even and quickly completed combustion.

CAI engines are typically equipped with a variable valve drive and direct gasoline injection. Different strategies exist for producing the CAI operation, which all have the goal of providing a relatively large proportion of residual gas to the combustion chamber contents of the Otto engine. The temperature of the combustion chamber content is increased by the hot residual gas so that the autoignition temperature is achieved during the compression phase and combustion is initiated without an additional triggering event being required like an ignition spark in conventional combustion processes of Otto engines or an injection of fuel as in combustion processes of diesel engines.

The large proportion of residual gas is, for example, realized as a result of the internal combustion engine being operated without valve overlap of the intake valves and exhaust valves of its combustion chambers, which also is described as negative valve overlap. A certain quantity of residual gas is thereby retained in the cylinder, which experiences an intermediate compression. As an alternative, said residual gas can be externally recirculated or can be drawn back into the combustion chamber by a short-term opening of the exhaust valve during the intake phase.

The optimized open-loop control, respectively closed-loop control, of the combustion on the basis of a combustion chamber signal plays a decisive role in the case of CAI combustion processes.

In the method known from the German patent publication DE 10 2004 032 986 A1, the position of a 50% mass conversion point is used as the parameter characterizing combustions. This point is characterized by the fact that 50% of the fuel proportion of a combustion chamber content is thereby combusted. In so doing, the determination of the 50% mass conversion point occurs collectively for all combustion chambers from the signal of a lambda sensor disposed in the total exhaust of the combustion chambers and/or in a combustion chamber-specific manner from the signals of cylinder-specific pressure sensors or ion current sensors.

In the known method, the 50% mass conversion point is adjusted in a first control circuit to a set value, which is not combustion chamber-specific. In a second control circuit, the parameters acquired in a combustion chamber-specific manner are additionally adjusted to each other.

In the German patent publication DE 10 2004 032 986, the use of the second control circuit is based on the grounds that an actual combustion behavior that deviates from the optimal combustion behavior can still occur in individual cylinders when the first control circuit is in a steady-state operation. This can then lead to results which have been negatively influenced. Different states of wear of the cylinders are seen to be a possible cause of such deviations.

All in all a mean value of the parameter, which is influenced by all of the combustion chambers, is acquired in the first control circuit and is adjusted to a set value, which is the same for all combustion chambers, with a manipulated variable that affects all of said combustion chambers. In the second control circuit, parameters acquired in a combustion chamber-specific manner are adjusted by manipulated variables formed in a combustion chamber-specific manner.

The phase positions of the opening of exhaust valves of the combustion chambers are used as the manipulated variable for changing the position of the 50% mass conversion point in the first control circuit. Injection pulse widths of pre-injections or main injections of fuel into the combustion chambers are used as said manipulated variable in the second control circuit. The intervention on gas exchange valves mentioned at the beginning of the application therefore refers to intervention on exhaust valves.

SUMMARY

The aim of the invention consists of a further improvement to the compensation for differences between combustion processes, which take place in a plurality of combustion chambers of an Otto engine operated with homogeneous filling of the combustion chambers and homogeneous charge compression ignition, said Otto engine having thereby a direct fuel injection and a variable valve drive.

The invention particularly distinguishes itself by the fact that a characteristic, in which charge change losses are reflected, is formed as the variable characterizing combustions and by the fact that a valve lift of an intake valve of the combustion chamber is changed as a manipulated variable.

Degradations to the efficiency of the engine's combustion, which are brought about by the physical work required for the change in load, are understood by the term charge change losses. Said work depends on the resistances in the intake system and/or in the exhaust gas system. Resistances in the intake system, which are the same for all combustion chambers, result, for example, as flow resistances of the throttle valve, the air filter and the mass air flow meter. Combustion chamber-specific resistances result from asymmetries in the intake tract geometry and by a non-ideal variable valve drive, in which the actual opening and closing angle and/or the valve lift curves situated between the respective opening angle and the associated closing angle are different from combustion chamber to combustion chamber. Influences attributed to the non-ideal valve drive are brought about by variations in manufacturing and during operation by component wear.

In practice the fuel saving HCCI operation can be carried out only in a partial range of all possible operating points of the internal combustion engine. This partial range is enlarged by the invention.

As a result of a characteristic, in which combustion chamber-specific charge change losses are reflected, being formed as a variable characterizing combustions, the invention allows these influences to be taken into account when controlling the internal combustion engine.

As a result of a valve lift of an intake valve of the combustion chamber being changed as a manipulated variable, the invention allows a compensation of these influences. It is also advantageous that interventions on the valve lift of exhaust valves also additionally remain possible, which can take place independently of the interventions on the valve lift of the intake valves and can be performed by other functions or control circuits.

A decoupling of the compensation for combustion chamber-specific differences from the setting of a 50% conversion point common to all combustion chambers is, for example, thereby achieved. As a result, competing control interventions are avoided.

This must be independent of the interventions on the exhaust valve, in particular on the closing angle EVC of the exhaust valve [EVC=Exhaust Valve Closed] because this parameter is typically needed as the intervention variable for regulating the combustion position MFB50 (position of the combustion center of gravity [mass fraction burnt 50%]).

On the other hand, the limitation to interventions on intake valves can, however, be seen as an advantage because it permits a combination with a combustion position control, wherein the latter acts on the exhaust valve.

Furthermore, the method according to the invention can particularly be used in conjunction with the currently favored HCCI engine operation having negative valve overlap (i.e. wherein the residual gas is retained and intermediate compression is present).

The method can also additionally be used in the SI operation [SI=Spark Ignition]. If a fully variable valve system is present, said method is already typically used in the SI operation for the reduction of the charge change losses. This occurs when there is slight/no throttling by means of an early closing of the intake valve (EIVC: earlier intake valve closing).

Additional advantages result from the dependent claims, the description and the accompanying figures.

It goes without saying that the previously stated characteristics and those to still be subsequently explained cannot only be used in the combinations stated in each case but also in other combinations or alone without departing from the scope of the present invention.

BRIEF DESCRIPTIONS OF THE DRAWINGS

Exemplary embodiments of the invention are depicted in the drawings and are explained in detail in the following description. The following are shown in each case in schematic depiction:

DETAILED DESCRIPTION

Figure 1:
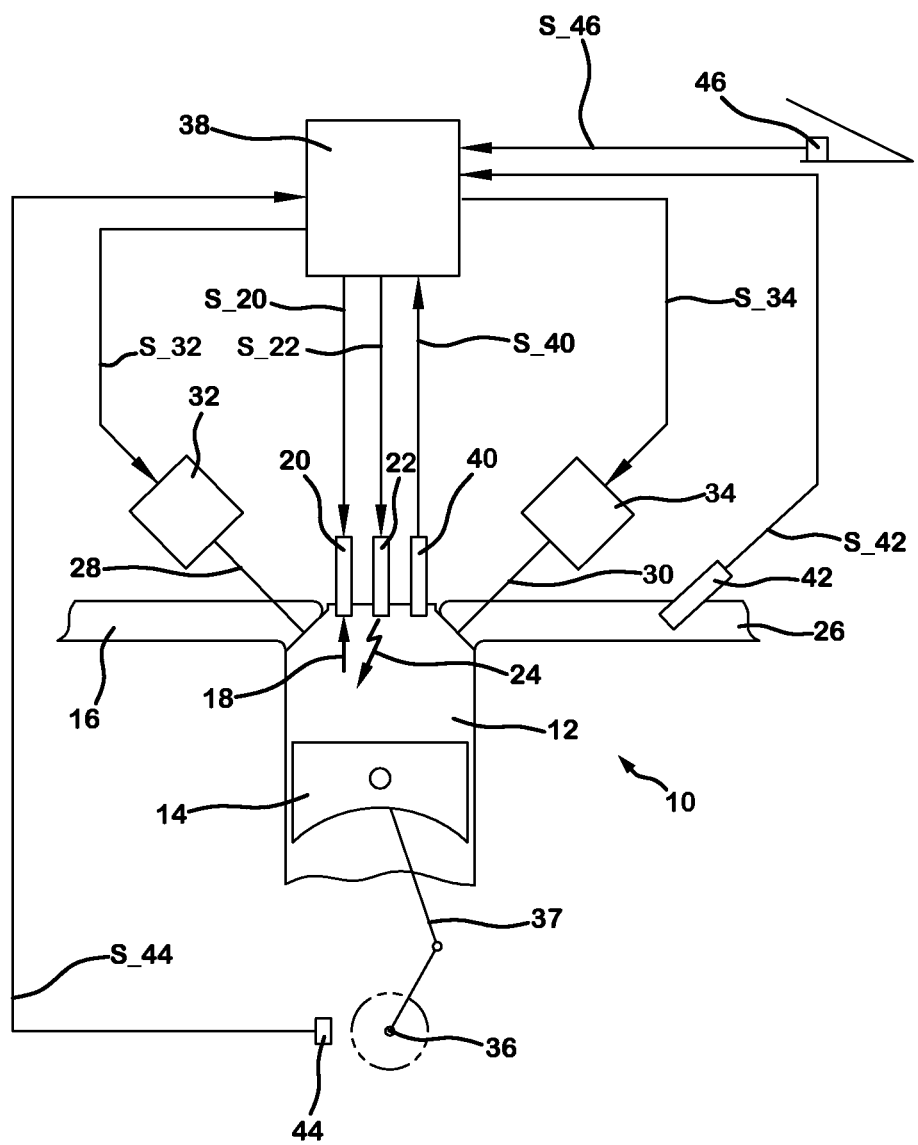
FIG. 1 is the technical environment of the invention.

FIG. 1 shows in detail the technical environment of the invention in the form of an internal combustion engine 10. The internal combustion engine 10 includes a plurality of combustion chambers, of which a combustion chamber 12 lies in the drawing plane in the depiction of FIG. 1 and is thereby identifiable. In the case of the selected depiction, the other combustion chambers lie above and below the drawing plane. The combustion chamber 12 is movably sealed by a piston 14 and is filled with air from an intake system 16. After the combustion chamber 12 has been filled with air, fuel 18 is injected directly into said combustion chamber 12 with an injector 20. In the case of a suitable combustion process, the combustion chamber content self-ignites in a controlled manner when the compression stroke occurs in the operating cycle. The internal combustion engine 10 is operated like a conventional Otto engine with externally-supplied ignition at operating points, whereat a controlled self-ignition is not possible. In this case, the ignition of the combustion chamber content takes place by means of an ignition spark 24 produced by a spark plug 22. The residual gases resulting from the combustion of the combustion chamber content are discharged via an exhaust gas system 26.

The internal combustion engine 10 is equipped with at least one intake valve 28 and at least one exhaust valve 30 for each combustion chamber 12 for controlling the change in the combustion chamber content, which is also referred to as gas exchange or charge change. In so doing, the intake valve 28 is actuated by an intake valve actuator 32 and the exhaust valve 30 by an exhaust valve actuator 34. The intake valve actuator 32 and the exhaust valve actuator 34 relate to electrohydraulic or other actuators, e.g. electromotive etc., which allow a fully variable control of the openings of the valves 28 and 30, i.e. a manipulation of the respective opening time, the respective closing time and the course of the valve opening situated between said opening time and said closing time. It goes without saying that the opening of the valves 28, 30 must in each cased be synchronized with the movement of the piston 14 in the cylinder, to which the combustion chamber 12 belongs. The movement of said piston 14 is reflected in the rotational movement of a crankshaft 36, which is connected to said piston 14 via a connecting rod 37.

The control of the internal combustion engine 10 via an actuation of the actuators, which are mentioned here by way of example, occurs by means of a control unit 38. The control unit 38 particularly emits signals S_20 for controlling a fuel feed across the injector 20, signals S_22 for triggering a combustion by activating the spark plug 22 and signals for controlling the change in the contents of the combustion chamber 12 by actuating the intake valve actuator 32 with a signal S_32 and by actuating the exhaust gas valve actuator 34 with a signal S_34.

In order to form the actuating signals S_20, S_22, S_32, S_34 and if need be other actuating signals for actuators that are not depicted in detail like throttle valves, resonance flaps, swirl flaps, exhaust gas recirculation valves, supercharging pressure actuators in turbocharged engines etc., said control unit 38 processes signals, in which operating parameters of the internal combustion engine 10 and torque demands by a driver and/or other control devices like control devices for improving the driving stability etc. are reflected. In the configuration, which is depicted in FIG. 1, these include signals S_40 of a combustion chamber-specific combustion chamber sensor 40 and/or signals S_42 of a combustion chamber-specific exhaust gas sensor 42, signals S_44 of an angle sensor 44, which detects the angular position of the crankshaft 36 and thereby the current position of the piston 14, and the signal S_46 of a driver command transmitter 46, which detects a torque demand by the driver. It goes without saying that this list is not meant to be comprehensive and that modern internal combustion engines 10 can also more or less include other sensors. It is, however, essential that the sensors used allow a detection of combustion chamber-specific values of a variable characterizing combustions.

Incidentally the control unit 38 is set up for the purpose, particularly programmed for the purpose, of implementing the method according to the invention or one of its embodiments presented here, a control of the procedural steps of said method being understood by implementation.

In a preferred embodiment, the control unit 38 is set up by loading a computer program having the characteristics of the independent computer program claim from a computer program product with the characteristics of the independent computer program product claim. By a computer program product, each data file or collection of data files is thereby understood, which contains the computer program in stored form, as well as each carrier, which contains such a data file or collection of data files.

The internal combustion engine 10 is suited for a HCCI combustion process by means of the injector 20, which allows a direct injection of fuel into the combustion chamber 12, and by means of it being possible to manipulate the opening of the intake valve 28 within broad limits. An operation of said internal combustion engine 10 with the HCCI combustion process is typically not possible at all operating points of said internal combustion engine 10. By means of the spark plug 22, said internal combustion engine 10 can be operated at the remaining operating points with a stably elapsing combustion process suitable for an Otto engine with externally-supplied ignition.

Figure 2:
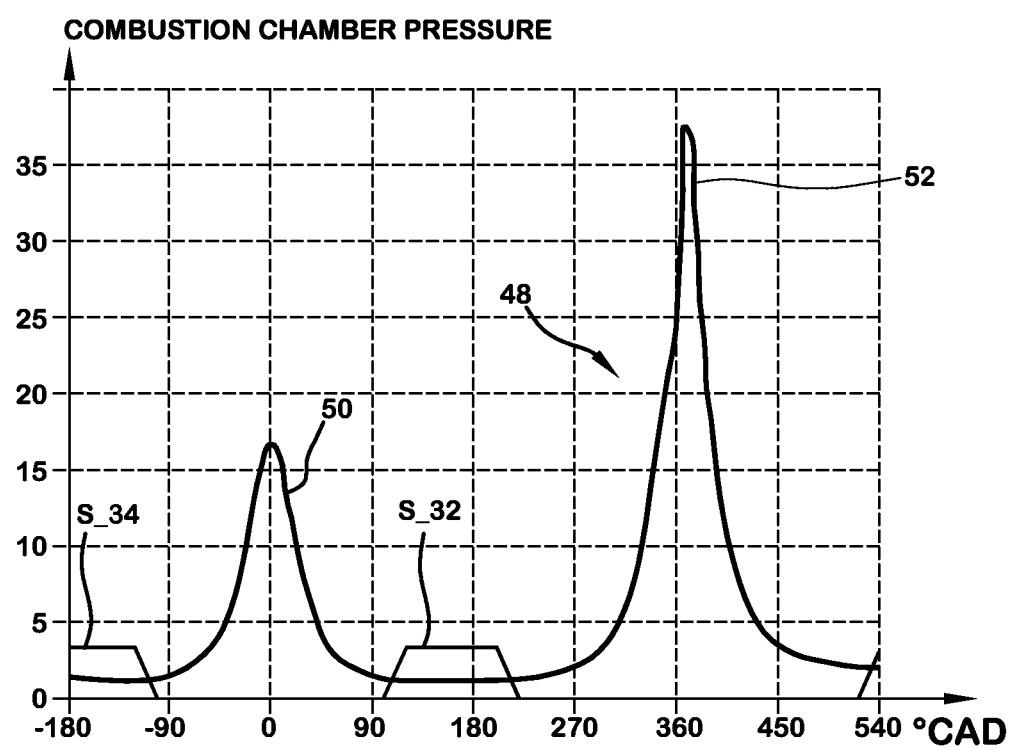
FIG. 2 is the curve of a combustion chamber pressure in the CAI operation of the internal combustion engine from FIG. 1.

FIG. 2 illustrates the course 48 of the combustion chamber pressure p in the CAI operation of the internal combustion engine 10 with negative valve overlap across two crankshaft revolutions, i.e. across a complete operating cycle, in crank angle degrees (abbreviated CAD (KWW)). The section extending from −180 CAD to 0 CAD is associated with the upward movement of the piston 14 during the exhaust stroke. The value 0E CAD indicates top dead center, which is associated with the charge change (charge change TDC). The section extending from 0E to 180E is associated with the downward movement of the piston 14 during the intake stroke. The section extending from 180E CAD to 360E CAD is associated with the upward movement of said piston 14 during the compression stroke. The top dead center of the piston movement associated with ignition (ignition TDC) lies at the value of 360 CAD. The section extending from 360 CAD to 540 CAD is associated with the downward movement of said piston 14 during the combustion stroke. The high levels of the signals S_32 and S_34 represent in each case crankshaft angle intervals, respectively associated time intervals, in which the intake valve 28, respectively the exhaust valve 30, is open. They therefore do not depict any pressure curves.

The situation depicted in FIG. 2 thereby represents a so-called negative valve overlap, wherein the opening intervals of the intake valve 28 and the exhaust valve 30 do not overlap at charge change TDC; thus enabling an intermediate compression of the combustion chamber content to occur by means of the piston 14 traveling upwards before the gas exchange TDC, which leads to the local pressure maximum 50.

The second pressure maximum 52 results from the compression occurring in the regular compression stroke and from the subsequent Otto engine controlled self-ignition and combustion of the combustion chamber content. A homogeneous fuel/air mixture is compressed for the Otto engine controlled self-ignition. Said mixture self-ignites as soon as sufficiently high temperature and pressure values are achieved in the combustion chamber 12. The state of the combustion chamber content required for reaching these values is achieved with the aid of the variable control of the gas exchange valves 28, 30. Said variable control of said gas exchange valves 28, 30 thus retains hot exhaust gas in said combustion chamber 12 using the signals S_32 and S_34 that are depicted in FIG. 2. The exhaust valve 30 is thereby closed well ahead of the charge change TDC and the hot residual gas remaining in the combustion chamber is compressed. The intake valve 28 first opens if intake manifold pressure again prevails in the combustion chamber 12 in order to prevent flow losses. The direct injection of fuel thereby offers the possibility of controlling the self-ignition timing by the fuel already being injected into the hot residual gas in the region of the maximum 50.

The ignition temperature is then achieved at the end of the compression stroke, i.e. when the piston 14 reaches the ignition TDC at 360 CAD, and the mixture begins to react simultaneously at many spots in the combustion chamber 12. A traveling flame front resulting from the mixture is thereby avoided. As a result, local temperature peaks are also avoided, which promote the development of high nitrogen oxide emissions when combustion processes work together with flame fronts.

In one embodiment of the invention, the characteristics pmi_ZV_j, j=1 to 4 are used as the variables characterizing the combustions. In so doing, the index j in each case numbers the cylinders and thereby the combustion chambers of the internal combustion engine 10.

Each characteristic pmi_ZV_j, j=1 to 4 represents a mean indicated pressure pmi during an intermediate compression phase ZV. In so doing, the curve of the measured combustion chamber pressure versus the crankshaft angle CAD is understood by the mean indicated pressure. The depiction of FIG. 2 corresponds in this respect to a pressure indication result. The mean indicated pressure pmi during an intermediate compression phase ZV appears in one embodiment as the volume integral of the indicated combustion chamber pressure p_zyl in the intermediate compression phase, which has been scaled to the stroke volume VH. The values 180 CAD before the gas exchange TDC and 180 CAD after the gas exchange TDC are used in one embodiment as integration limits, which correspond to the range of −180 CAD to +180 CAD in the depiction of FIG. 2. These range specifications represent a preferred embodiment. Range limits deviating therefrom are, however, also possible.

The greater the gas exchange losses are, the lower the pressure p will be particularly in the CAD section with an opened intake valve 28, i.e. at a high level of the signal S_32. At lower or even negative pressure values, the value of the integral will be smaller so that the value of the integral $$\text{pmi\_ZV\_j} = \frac{1}{VH} \int_{-180CAD}^{180CAD} \text{p\_zyl\_j}(\varphi) \, dV$$

represents in each case a measurement for the combustion chamber-specific gas exchange loss. In so doing, p_zyl_j is the combustion chamber pressure detected in a combustion chamber-specific manner, as said pressure is reflected in the signal S_40 from FIG. 1. Furthermore, v=0 is present at top dead center of the gas exchange.

Figure 3:
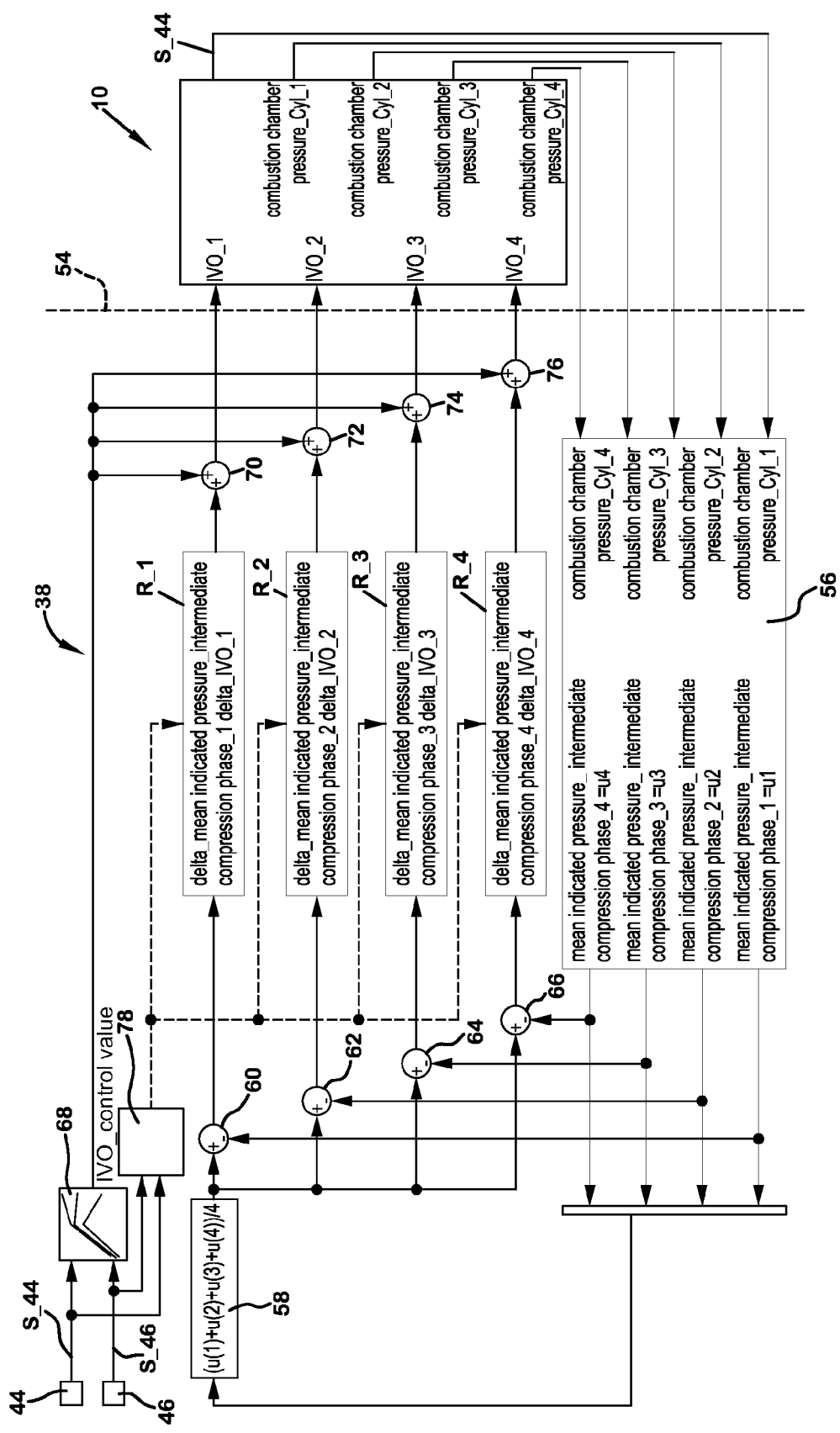
FIG. 3 is a configuration of a method according to the invention in the form of an arrangement of function blocks.

FIG. 3 shows a schematic depiction of an embodiment of a method according to the invention, with which a manipulated variable S_32 of a valve lift of an intake valve 28 in the combustion chamber 12 is changed as a function of a variable characterizing combustions, in which combustion chamber-specific charge change losses are reflected. In this instance, j=4 means that the embodiment depicted in FIG. 3 relates to a four cylinder engine. The invention can however, of course, be used with internal combustion engines having other numbers of cylinders.

As the subject matter for FIG. 3, cylinder-specific combustion chamber pressure values p_zyl_, j=4, and an item of information concerning crankshaft angle S_44 are acquired in the internal combustion engine 10. The dashed line 54 separates functions associated with the control unit 38 from functions, which are associated with said internal combustion engine 10. In block 56 a processing of the cylinder-specific pressure values p_zyl_j, with j=1 to 4, to cylinder-specific characteristics or parameters pmi_ZV_j, with j=1 to 4, takes place. These parameters derived in a cylinder-specific manner are averaged in block 58. The mean value is, for example, derived by adding up the parameters ascertained for a complete operating cycle and dividing that by the number of the cumulated parameters. In the linkups 60, 62, 64, 66, a parameter derived in a cylinder-specific manner, i.e. an output signal of block 56, is subsequently subtracted in each case from the mean value that was previously derived. The difference derived in this manner is provided to a cylinder-specific controller R_j, j=1 to 4 as the cylinder-specific control deviation delta_pmi_ZV_j, j=1 to 4, and is processed by said controller to a cylinder-specific correction variable delta_IVO_j, j=1 to 4. IVO thereby stands for Intake Valve Open and denotes the opening time of the intake valve 28 or the associated crankshaft angle value CAD.

Parallel to this, a base value IVO_control value common to all cylinders is continuously ascertained. This can, for example, take place as a result of a characteristic diagram 68 being addressed with an item of information concerning engine rotational speed that was derived from the signal S_44 and from a signal based on the driver's demand.

In cylinder-specific linkups 70, 72, 74, 76, the base value IVO_control value is subsequently in each case linked up with a correction value delta_IVO_j, j=1 to 4, determined in a cylinder-specific manner.

The result of this linkup is designated in FIG. 3 by IVO_j, j=1 to 4. In one embodiment, the result IVO associated with each cylinder represents in each case the ascending slope of the signal S_32, with which the associated intake valve 28 is actuated to open.

The control is thereby configured such that the combustion chamber-specific adjustment operations S_32 reduce in each case the deviation of the characteristic formed in a combustion chamber-specific manner $$\text{pmi\_ZV\_j} = \frac{1}{VH} \int_{-180CAD}^{180CAD} \text{p\_zyl\_j}(\varphi) \, dV$$

from the mean value of these characteristics derived from all of the combustion chambers. If the integral is comparatively small, this will lead in one embodiment to an earlier opening of the intake valve via said control if the earlier opening of the intake valve has the effect of increasing the integral.

The control as described takes place under steady-state operating conditions. A block 78 evaluates the engine rotational speed ascertained from the signal S_44 and the load on the internal combustion engine 10 ascertained from the signal S_46 for the purpose of recognizing steady-state operating conditions. When the constancy of load and engine rotational speed is sufficient, said block 78 allows a control by activating the controllers R_j, j=1 to 4.

As a result, the connection of FIG. 3 to FIG. 1 therefore represents an embodiment of a method for compensating for combustion chamber-specific actual values of a parameter, which characterizes combustions, between a plurality of combustion chambers of an Otto engine operated with homogeneous filling of the combustion chambers and charge compression ignition. Said Otto engine operates with a direct fuel injection and a variable valve drive.

In this embodiment, integral values of a cylinder pressure signal are formed for each cylinder as the variable which characterizes combustion.

These integral values represent an example of a characteristic, wherein combustion chamber-specific charge change losses are reflected.

The integration is thereby not to be understood as limited to the integration limits specified by way of example. It is however preferred that integration intervals enclose the top dead center of the piston movement between an exhaust stroke and an intake stroke.

In the embodiment described up until now, the characteristic pmi_ZV, i.e. the mean indicated pressure of the intermediate compression phase, which extends from 180 CAD before gas exchange TDC to 180 CAD after gas exchange TDC, is evaluated as the measurement for the cylinder-specific charge change losses. As an alternative, the integration can also be formed from EVO [Exhaust Valve Opened] to IVC [Intake Valve Closed]. In each case, the correspondingly formed characteristic is used as the reference variable of a compensatory regulation of the cylinders.

The method can furthermore be used for the correcting of tolerances of a fully variable valve system. This can result on the one hand by correcting the closing time of the intake valve (IVC). In the event this correction of the IVC, for example, already takes place via the evaluation of other combustion chamber pressure characteristics or other sensor signals (structure-borne noise), a correction of the valve lift of the intake valve (IVL) can alternatively occur.

Finally it should be noted when using the method in the FES operation with an externally-supplied ignition by means of a spark plug 22 that the characteristic pmi_ZV is possibly no longer conclusive enough due to the special valve control (the cylinder pressure shows only one—as a rule considerably noise-affected—curve without a significant compression stroke of the piston as there is no intermediate compression).

The cylinder pressure drops after the closing of the intake valve in the expansion phase of the intermediate compression. In this case, the evaluation of an alternative pressure characteristic is worth considering. Pressure at a certain crankshaft angle would be intuitively reasonable to consider. An individual pressure value is, however, typically greatly affected by noise, so that it is more favorable to identify an adiabatic curve based on the least squares method from IVC up until bottom dead center (respectively in a sub-interval).

$$pv^{kappa}=C$$

Either the constant C directly or else a pressure value at a certain crankshaft angle, which is derived from said constant C, can then be used as the characteristic. The drop in pressure (difference between the mean pressure value before the closing of the intake valve and the pressure calculated via the adiabatic curve after the closing of the intake valve at a certain angle) is also potentially suitable as the characteristic.

The corrective intervention takes place analogous to the HCCI operation in a cylinder-specific manner; however on the control parameter IVC_i, respectively IVL i.

In the embodiment, which has been explained in reference to FIG. 3, the integral values are individually formed for each cylinder and a mean value or the cylinder-specific integral values is ascertained. This mean value is used as a set value for an adjustment of each individual integral value of the cylinder-specific integral values.

A point in time, whereat an intake valve opens, is influenced as a manipulated value. A point in time is alternatively or additionally influenced, at which an intake valve closes, and/or a maximum value of a valve lift, i.e. a maximum valve lift, is influenced.

Provision is made in another alternative embodiment for the integral values to be formed individually for each cylinder, for a predetermined set value of the cylinder-specific integral values to be ascertained and for each of the cylinder-specific integral values to be controlled to a common set value.

Figure 4:
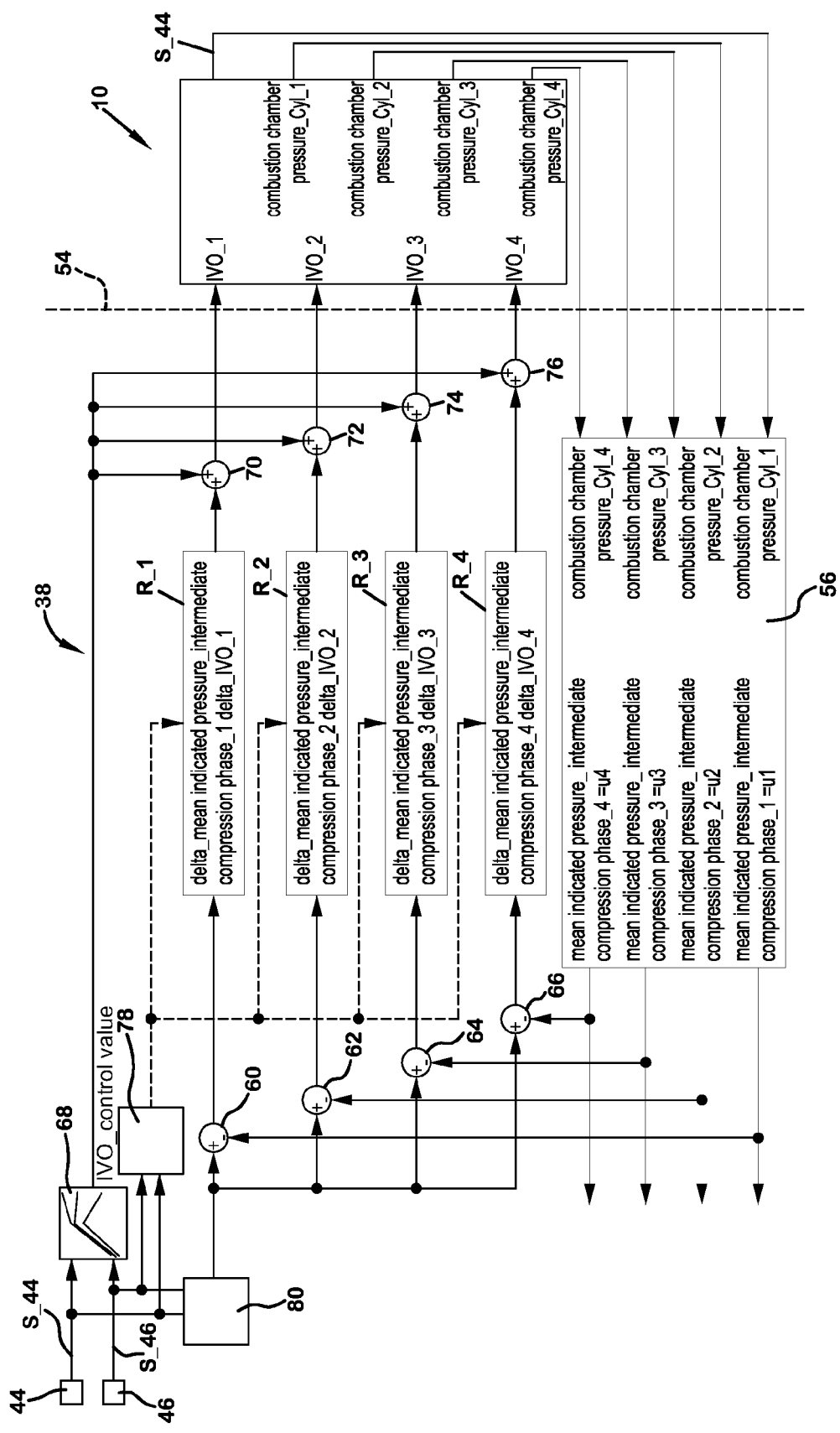
FIG. 4 is a further configuration of a method according to the invention in a function block diagram.

This embodiment is represented by FIG. 4. The subject matter of FIG. 4 is different from that of FIG. 3 in that the set value is formed in a different manner. In the case of the subject matter of FIG. 4, this results from accessing a characteristic diagram 80, which in the embodiment depicted is addressed with load and engine rotational speed. The characteristic diagram replaces in this regard the formation of the mean value in block 58 of FIG. 3.

This embodiment has the additional advantage of regulating the gas exchange losses absolutely always in the same manner independently of the prevailing environmental conditions (atmospheric pressure, atmospheric temperature, fuel quality). A disadvantage would be the necessity for an additional application of the pmi_ZV-set value characteristic diagram.

Finally the correction values ascertained in the HCCI engine operation can be stored in corresponding correction characteristic diagrams as a function of the operating point in order to subsequently be directly used in the open-loop control (i.e. without switching on the closed-loop control). This can also be understood as a calibration of the valve system. This approach is particularly recommended if primarily component tolerances and the effects of wear are to be compensated.

The combustion chamber-specific actual values are formed as a function of signals of combustion chamber-specific sensors in both embodiments. Deviations of the combustion chamber-specific actual values from a set value are processed to manipulated values, with which a valve lift of an intake valve is changed in the gas exchange phase of an internal combustion engine.

In an alternative embodiment to the evaluation of combustion chamber-specific combustion chamber pressure values, cylinder-specific lambda values are acquired and processed as the variable characterizing combustion. The charge change losses are reflected in charging losses and therefore in cylinder-specific lambda values. These can therefore be alternatively used as reference variables of the compensatory regulation of the cylinders.

The invention claimed is:

1. A method for compensating for combustion chamber-specific actual values of a parameter characterizing combustion between a plurality of combustion chambers of an Otto engine operated with homogeneous filling of the combustion chambers and homogeneous charge compression ignition, said Otto engine operating with a direct fuel injection and a variable valve drive, comprising:
   forming the combustion chamber-specific actual values as a function of signals of combustion chamber-specific sensors;
   processing deviations of the combustion chamber-specific actual values from a set value to manipulated variables;
   changing a valve lift of a gas exchange valve of a combustion chamber;
   forming combustion chamber-specific charge change losses, as a variable characterizing combustions; and
   changing a valve lift of an intake valve of the combustion chamber as a manipulated variable.

2. The method according to claim 1, wherein the parameter characterizing combustion comprises integral values of a cylinder pressure signal for each cylinder.

3. The method according to claim 2, wherein integration intervals enclose the top dead center of the piston movement between an exhaust stroke and an intake stroke.

4. The method according to claim 1, further comprising:
   acquiring and processing cylinder-specific lambda values as a parameter characterizing combustion.

5. The method according to claim 4, wherein the integral values are individually formed for each cylinder, a mean value of the cylinder-specific integral values is ascertained and the mean value is used as a set value for an adjustment of each of the cylinder-specific integral values.

6. The method according to claim 4, wherein the integral values are individually formed for each cylinder, a predetermined set value of the cylinder-specific integral values is ascertained and an adjustment of each of the cylinder-specific integral values to the common set value is carried out.

7. The method according to claim 1, wherein a point in time, at which an intake valve opens, is influenced as a manipulated variable and/or a point in time, at which an intake valve closes, is influenced as a manipulated variable and/or a maximum value of a valve lift is influenced as a manipulated variable.

8. A control unit, which is equipped to compensate for combustion chamber-specific actual values of a parameter, comprising combustions, between a plurality of combustion chambers of an Otto engine operated with homogeneous filling of the combustion chambers and homogeneous charge compression ignition, said Otto engine operating with a direct fuel injection and a variable valve drive and said control unit being equipped to form the combustion chamber-specific actual values as a function of signals of combustion chamber-specific sensors and to process deviations of the combustion chamber-specific actual values from a set value to manipulated variables, with which a valve lift of a gas exchange valve of a combustion chamber is changed, thereby characterized in that said control unit is thereby equipped to form a characteristic, in which combustion chamber-specific charge change losses are reflected, as a variable comprising combustions and to change a valve lift of an intake valve of the combustion chamber as a manipulated variable.

9. The control unit according to claim 8, wherein it is equipped for the purpose of controlling a sequence of a method according to claim 2.

10. A computer program, which is stored in a memory of and programmed to run in a control unit of an internal combustion engine operated with homogenous filling of the combustion chambers and homogeneous charge compression ignition, said engine operating with a direct fuel injection and a variable valve drive, and the computer program being programmed to:

forming combustion chamber-specific actual values as a function of signals of combustion chamber-specific sensors;

compensating for combustion chamber-specific values of a parameter, comprising combustions, between a plurality of combustion chambers;

processing one or more deviations of the combustion chamber-specific values from a set value to manipulated variables;

changing a valve lift of a gas exchange valve of a combustion chamber based on the one or more deviations;

forming a characteristic, in which combustion chamber-specific charge change losses are reflected, as a variable comprising combustions; and changing a valve lift of an intake valve of the combustion chamber as a manipulated variable.

11. At least one machine-readable storage device comprising machine-readable instructions that, when executed by the electronic system of claim 10, cause the electronic system to perform a method according to claim 1.

12. An electronic system, disposed in a control unit of an internal combustion engine operated with homogenous filling of the combustion chambers and homogeneous charge compression ignition, said engine operating with a direct fuel injection and a variable valve drive, comprising at least one processor and at least one memory device, the at least one memory device storing instructions, which when executed by the at least one processor, cause the at least one processor to:

form combustion chamber-specific actual values as a function of signals of combustion chamber-specific sensors;

compensate for combustion chamber-specific values of a parameter, comprising combustions, between a plurality of combustion chambers;

process deviations of the combustion chamber-specific values from a set value to manipulated variables;

change a valve lift of a gas exchange valve of a combustion chamber based on the one or more deviations;

form a characteristic, in which combustion chamber-specific charge change losses are reflected, as a variable comprising combustions; and change a valve lift of an intake valve of the combustion chamber as a manipulated variable.

* * * * *